(No Model.)

C. A. ANDERSON.
CHECK ROW CORN PLANTER.

No. 364,463. Patented June 7, 1887.

Witnesses:
A. H. Orwig.
O. W. Stiles

Inventor:
Charles A. Anderson,
By Thomas C. Orwig, Atty.

N. PETERS, Photo-Lithographer, Washington, D. C.

UNITED STATES PATENT OFFICE.

CHARLES A. ANDERSON, OF ROCKFORD, ILLINOIS.

CHECK-ROW CORN-PLANTER.

SPECIFICATION forming part of Letters Patent No. 364,463, dated June 7, 1887.

Application filed March 11, 1887. Serial No. 230,492. (No model.)

*To all whom it may concern:*

Be it known that I, CHARLES A. ANDERSON, a citizen of the United States of America, and a resident of Rockford, in the county of Winnebago and State of Illinois, have invented new and useful Improvements in Check-Row Corn-Planters, of which the following is a specification.

My improvements relate to the planters for which United States Letters Patent were issued to me February 29, 1876, No. 174,179, and May 2, 1882, No. 257,429; and my invention consists in the construction and combination of a detachable and adjustable cam with a bent lever connected with the seed-slide, a detachable collar for the hub of the auxiliary wheel, provided with cams that project in reverse ways, and markers on the auxiliary wheel, as hereinafter set forth, pointed out in my claims, and illustrated in the accompanying drawings, in which—

Figure 1:
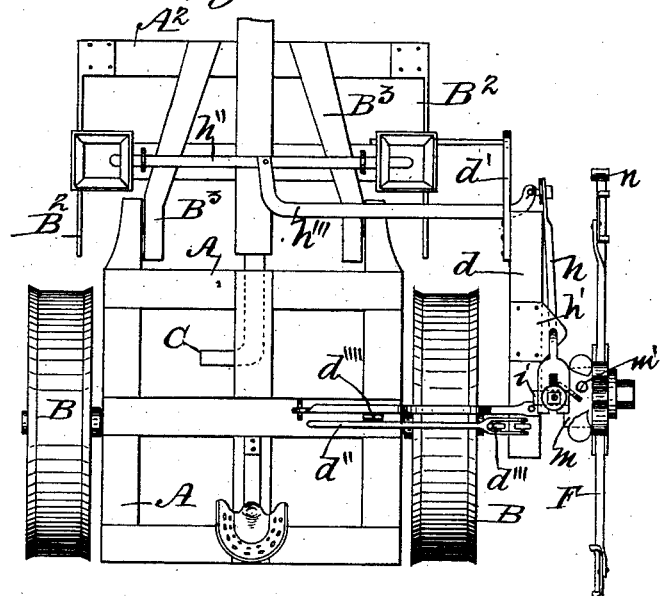
Figure 2:
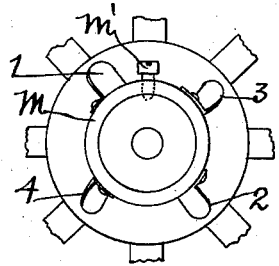
Figure 3:
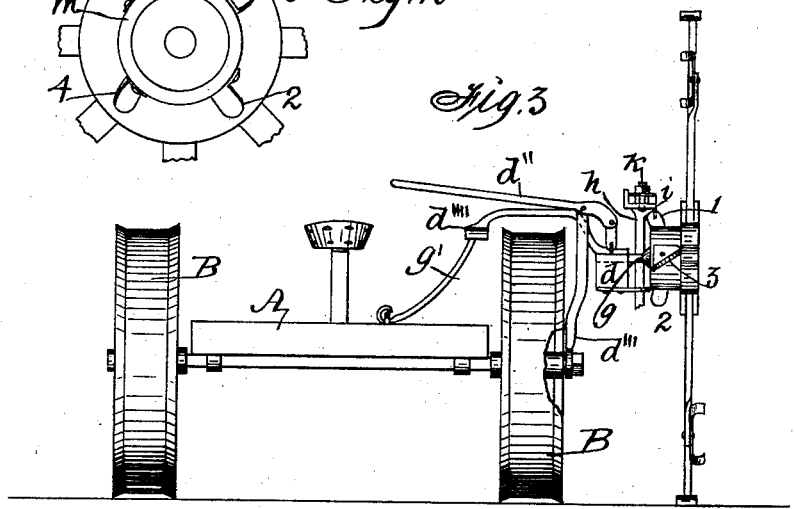

Figure 1 is a top view of my complete planter. Fig. 2 is an enlarged face view of the inner end of the hub of the auxiliary wheel, having the adjustable collar and cams fixed thereto by means of a set-screw. Fig. 3 is a rear end view of the machine.

A is the frame of the carriage, supported upon wheels B B in a common way. $A^2$ is the front or runner-frame, supported upon runners $B^2$ in a common way. The hounds $B^3$ of the front carriage are hinged to the projecting side bars of the rear carriage-frame, as clearly shown in Fig. 1.

C is an elbow-shaped bar, fixed to the rear end of the tongue of the runner-frame in such a manner that it will engage the under side of the rear carriage and restrict the depression of the front end of the tongue and carriage, and also in such a manner that the driver on the seat can place his foot on the bar and thereby depress the heels of the runners for the purpose of regulating their depth in the ground, so that the corn may be planted as deep in stiff or hard ground as in loose or soft ground.

$d$ is a straight bar of wood hinged to the runner-frame by means of a metal extension, $d'$, in such a manner that its rear end can be raised and lowered.

$d''$ is a lever pivoted to the top of a fulcrum, $d'''$, that is connected with the axle of the carriage in such a manner that the long arm of the lever will extend within reach of the driver, so that he can, when on his seat, depress the said arm to thereby elevate the rear end of the bar $d$ and the auxiliary wheel F, carried by the said bar.

$d''''$ is a catch that retains the lever depressed and the bar elevated.

$g$ represents the axle upon which the wheel F rotates. It is fixed to the rear portion of the bar $d$, and has a bent extension, $g'$, that arches over the carriage-wheel B and is hinged to the central portion of the rear carriage-frame.

$h$ is an elbow-shaped lever, pivoted in bearings $h'$, fixed to the bar $d$ in such a manner that it will vibrate horizontally. Its front end is flexibly connected with the seed-slide $h''$ by means of a bent bar, $h'''$, in such a manner that when the lever is vibrated it will impart a rectilinear reciprocating motion to the seed slide, as required to drop seeds from the two seed-boxes simultaneously.

$i$ is an adjustable cam clamped to the rear end of the lever $h$ by means of a set-screw, $k$, that is passed through a slot in the lever in such a manner that the cam can be readily adjusted relative to the cams and markers carried by the auxiliary wheel F, as required to operate the lever and seed-slide at the same instant that one of the markers makes a print in the ground to indicate the point where the seeds were dropped, so that on a return trip the seeds can be dropped in line with the rows previously planted and check-rows produced without any previous marking of the ground.

$m$ is a collar, adjustably connected with the inner end of the hub of the wheel F, by means of a set-screw, $m'$, in such a manner that it can be readily adjusted relative to the markers $n$ on the wheel F. The wheel has radial arms or spokes, and two of these arms, that are diametrically opposed to each other, carry the cross-heads or markers $n$ in such a manner that they will come flat in contact with the loose ground as the wheel revolves and make plainly-visible prints, while the cross-heads on the remainder of the spokes are fixed in such a manner that their sharp edges will enter the ground without making plain marks. The collar $m$ has cams 1 2 3 4, equidistant apart. Two of them are on the inner edge and inclined so that they will engage the cam $i$, as required, to press the rear end of the lever outward. The other two are on the outer edge of the collar and inclined, as required, to press the rear end of the same lever inward. It is therefore obvious that when the cams $i$ and 1 2 3 4 are properly adjusted relative to each other and the markers $n$ that intermittent motions will be imparted to the seed-slide at regular intervals as the machine is advanced, as required, to plant seeds at equal distances apart and to mark the point where they are planted, to thereby direct the planting on a return trip, as required, to produce check-rows.

I claim as my invention—

1. The combination of the lever $h$, the adjustable cam $i$, the detachable and adjustable collar $m$, having fixed cams 1 2 3 4, and the wheel F, having markers $n$, for the purposes stated.

2. The combination of the bar $d$, having the cam $i$, the axle $g\,g'$, carrying the wheel F, having markers $n$, the collar $m$, having cams 1 2 3 4, the lever $d''$, the fulcrum $d'''$, a seed-slide, $h''$, and a connecting-bar, $h'''$, constructed, arranged, and combined with a corn-planter, substantially as shown and described, for the purposes stated.

CHARLES A. ANDERSON.

Witnesses:
JACOB BEHEL,
A. O. BEHEL.